UNITED STATES PATENT OFFICE.

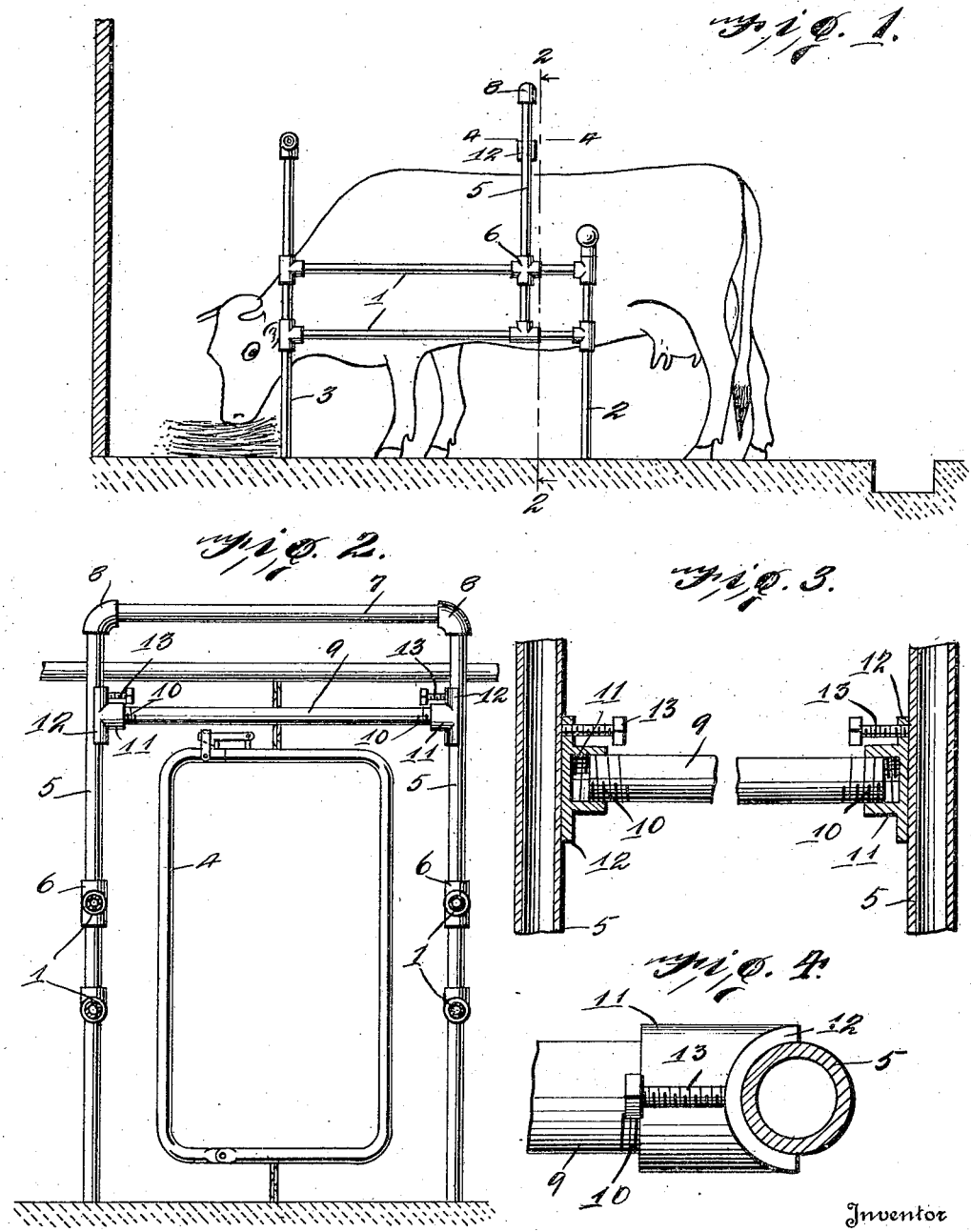

NELSON YOUNG, OF KIS-LYN, PENNSYLVANIA.

STABLE-FIXTURE.

1,262,731.

Specification of Letters Patent.   Patented Apr. 16, 1918.

Application filed May 11, 1916.   Serial No. 96,908.

*To all whom it may concern:*

Be it known that I, NELSON YOUNG, a citizen of the United States of America, residing at Kis-Lyn, in the county of Luzerne and State of Pennsylvania, have invented certain new and useful Improvements in Stable-Fixtures, of which the following is a specification, reference being had therein to the accompanying drawing.

This invention relates to a stable fixture and has for its principal object the production of a simple and efficient means for causing a cow to move to the rear portions of a stall upon making excretions.

Another object of this invention is the production of a stable fixture in which a bar is employed which extends across the upper portions of the stall at a predetermined height above the cow's back so that when a cow humps her back it will strike against the bar which will, of course, cause the cow to move to the rear portions of the stall before making excretions, thereby preventing the mixture of refuse with the bedding within the stall.

Another object of this invention is the production of a stable fixture wherein an adjustable bar is provided, having adjustably mounted plates at its end portions, these plates being so constructed as to retain the bar in an adjusted set position at a desired height.

With these and other objects in view this invention consists of certain novel combinations, constructions, and arrangements of parts as will be hereinafter fully described and claimed:

In the accompanying drawing:

Figure 1 is a side elevation of a complete stall, illustrating the manner in which the stable fixture is used.

Fig. 2 is a section taken on the line 2—2 of Fig. 1, looking in the direction of the arrows.

Fig. 3 is a fragmentary sectional view through a portion of the device, illustrating the manner in which the bar is supported, this bar being broken away and shown in side elevation.

Fig. 4 is a fragmentary plan view taken on the line 4—4 of Fig. 1.

Referring to the accompanying drawings by numerals it will be seen that an ordinary stall is disclosed comprising the side bars 1 and supporting posts 2 and 3 as well as an ordinary stanchion 4. The cow, of course, stands in the stall so as to allow her neck to extend through the stanchion 4 which may be of any suitable construction, thereby preventing the cow from running loose when not desired.

The standards 5 are carried by the joints 6 supported upon the stall and are connected to the cross pipe 7 by means of the elbows 8 whereby the standards 5 will be held from spreading when in operation. The bar 9, which, of course, may be either hollow or solid as desired is provided with oppositely threaded ends 10 which fit within the internally threaded collars 11 of the semi-circular vertically extending plates 12. These plates 12 are formed integral upon the collars 11 and are semi-circular so as to conform in contour to the outer surface of the standards 5, as shown clearly in Fig. 4. Therefore, it will be seen that as the bar 9 is moved upwardly or downwardly the plates 12 will ride evenly along upon the standards 5 thus preventing the accidental displacement of the bar 9. When, however, it is desired to retain the bar 9 in a desired set position it may be rotated so as to cause the oppositely threaded ends thereof to move the collars 11 of the plates 12 outwardly toward the end portions of the bar so as to cause the plates 12 to bind firmly upon the standards 5 and thus positively retain the bar 9 in a set position. Since the pipe 7 prevents the standards 5 from spreading it will be seen that the frictional engagement of the plates 12 upon the standards 5 will retain the bar 9 at a predetermined height above the cow's back. If so desired set screws 13 may be passed through the plates 12, as clearly shown in Fig. 3, so as to bind upon the standards 5 and in this manner also assist the plates in retaining the bar 9 in a set position.

When this device is in use it will be seen that a cow may be turned into the stall so as to be retained therein by means of the stanchion 4. The set screws 13 may be loosened while the bar 9 may be rotated so as to draw the collars 11 inwardly thereon, at which time the frictional or binding engagement of the plates 12 upon the standards 5 will be released. The bar may then be moved to a desired position so as to be positioned approximately an inch or so above the cow's back, at which time the bar may be again rotated so as to cause the plates to move into a binding engagement with the standards 5. As above set forth, this action will retain the bar in a desired set position. When the cow desires to make excretions she first moves her hind legs forwardly, thus humping her back. As the bar 9 is only a short distance above her back in a normal condition when she humps her back it will come into engagement with the bar 9. This disagreeable action will cause the cow to move to the rear portion of her stall so that when she again humps her back it will not come into engagement with the bar 9. Thus, the excretions or refuse will fall at the rear portions of the stall and will not become mixed with the clean bedding in the main portions of the stall.

From the foregoing description it will be seen that a very simple and efficient stable fixture has been produced which is constructed so as to be adjustable, thereby allowing it to be moved to accommodate various sized cows and which is so constructed as to strike upon the cow's back under certain conditions, thus causing the cow to move and preventing under certain conditions the soiling of the bedding, whereby the stall at all times will be retained in a sanitary condition.

What is claimed is:

1. In a stable fixture of the class described, the combination of a pair of standards, plates mounted upon said standards, integral threaded collars formed upon said plates, a bar having oppositely threaded ends engaging said collars, said bar extending across the distance between said standards, said bar being adapted to be carried at a predetermined height above the back of a cow, said bar being adapted to be rotated so as to force said collars from the end portions thereof, whereby said plates will positively bind upon said standards so as to retain said bar in a desired set position, whereby said bar may be carried above the back of a cow so that when the cow humps her back under certain conditions her back will engage the bar which action will cause the cow to move to the rear portion of the stall.

2. In a stable fixture of the class described, the combination of a pair of parallel standards, plates positioned upon said standards and conforming in shape and contour thereto, whereby said plates may easily ride upon said standards, integral threaded collars formed upon said plates, a bar having oppositely threaded ends engaging said collars, means for holding said standards from spreading at their upper ends, said bar being adapted to be moved to a predetermined height above a cow's back, at which time the same may be rotated so as to cause said collars to hold said plates in binding engagement with said standards, thereby positively retaining said bar in a desired set position above a cow's back.

3. In a stable fixture of the class described, the combination of a pair of standards, plates slidably mounted upon said standards, collars carried by said plates, a bar carried by said collars, said bar being adapted to be moved to a desired position so as to be carried at a spaced distance above a cow which may be standing beneath said bar, set screws passing through said plates and engaging said standards for retaining said bar in an adjusted set position above a cow's back.

In testimony whereof I hereunto affix my signature.

NELSON YOUNG.

Copies of this patent may be obtained for five cents each, by addressing the "Commissioner of Patents, Washington, D. C."